(No Model.)
W. L. & J. C. WILSON.
GATE.
No. 337,104. Patented Mar. 2, 1886.
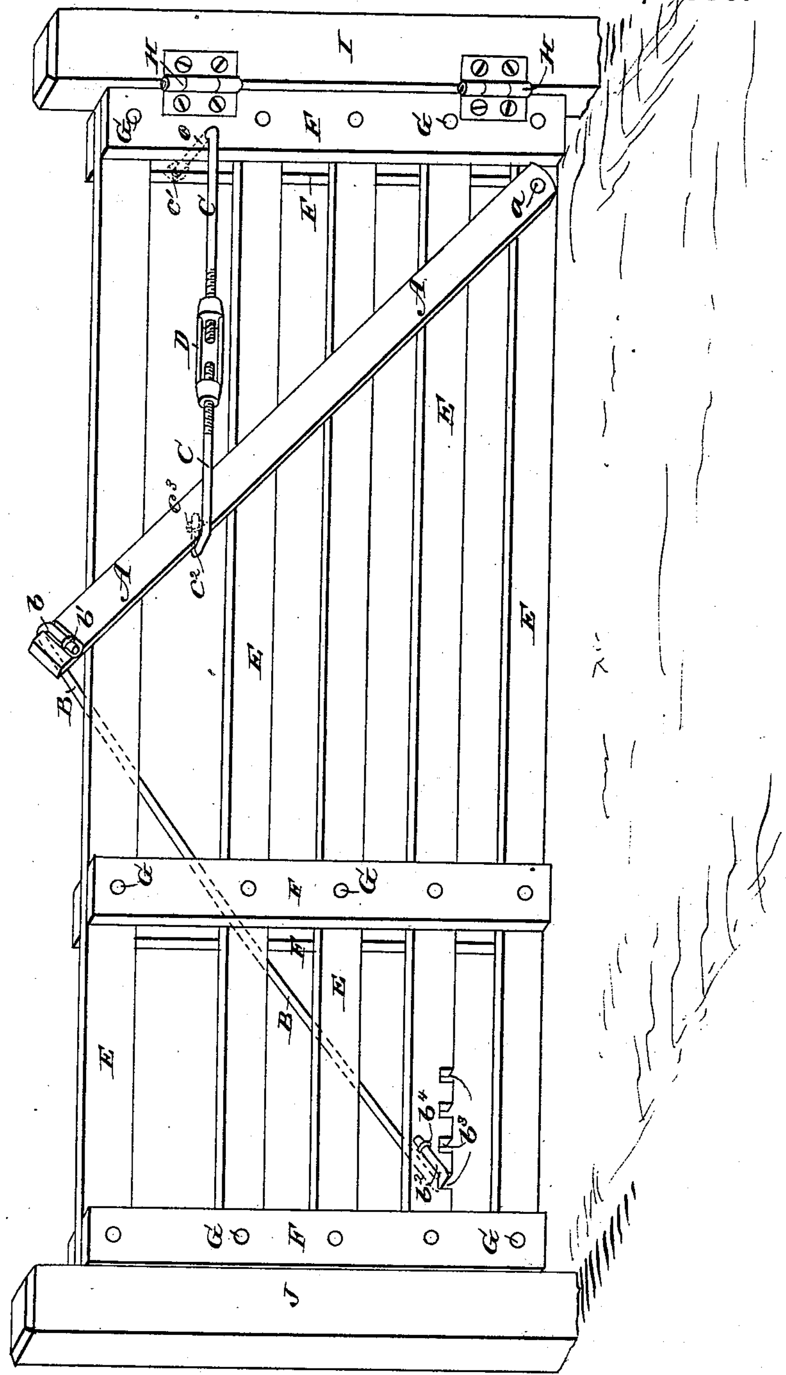
WITNESSES:
Fred Berger
C. Sedgwick
INVENTOR:
W. L. Wilson
J. C. Wilson
BY Munn & Co
ATTORNEYS.
N. PETERS. Photo-Lithographer, Washington, D. C.

UNITED STATES PATENT OFFICE.

WILLIAM L. WILSON AND JOHN C. WILSON, OF CYNTHIANA, INDIANA.

GATE.

SPECIFICATION forming part of Letters Patent No. 337,104, dated March 2, 1886.

Application filed October 9, 1885. Serial No. 179,442. (No model.)

*To all whom it may concern:*

Be it known that we, WILLIAM L. WILSON and JOHN C. WILSON, of Cynthiana, in the county of Posey and State of Indiana, have invented a new and Improved Gate, of which the following is a full, clear, and exact description.

Our invention relates to a device intended to prevent the sagging of gates, and to hold their outer ends up any desired distance from the ground, to allow the gate to clear obstructions and swing open more easily; and the invention has for its object to provide a simple, inexpensive, and efficient device of this character.

The invention consists of a lever pivoted to the lower rear part of the gate and extending diagonally upward and forward about to the top of the gate, a bar connected to the upper end of the lever and ranging diagonally downward and forward to and connected with the lower front part of the gate, and a draw-up rod connecting the upper part of the lever with the upper rear part of the gate.

The invention comprises, also, certain novel constructions of parts and novel adjustments thereof with relation to each other and with the gate, all as hereinafter fully described and claimed.

Reference is to be had to the accompanying drawing, forming part of this specification, and which is a perspective view of a gate with my improvement applied to it.

The letter A indicates a bar or lever, which lever is pivoted at $a$, at its lower end, to the rear lower corner of the gate, and extends forward and upward diagonally about to the lengthwise center of the gate, and preferably projects a little above the gate.

The letter B indicates a rod or bar which is connected to the forward end of lever A, preferably by a hook, $b$, formed at the upper end of the bar, and which may be held to the lever by a staple, $b'$. The bar B extends forward and downward diagonally to the lower front part of the gate, to which it is connected, preferably, by means of a hook, $b^2$, entering any one of a series of notches, $b^3$, formed in the gate, and the hook $b^2$ will be held, preferably, by a staple, $b^4$.

The letter C indicates the draw-up rod, which rod is provided with a turn-buckle, D, connecting its separate end parts. One end of the rod C is connected pivotally to the rear upright of the gate next the gate-hinges by means of its bent end $c$ entering a hole bored through the gate, and a retaining-nut, $c'$, is screwed onto the threaded extremity of the end $c$ of the rod. The forward end of the rod is connected to the lever A, preferably by means of a hook, $c^2$, formed on the rod, and which is held thereto by a staple, $c^3$.

It is evident that by turning the turn-buckle D so as to draw up or shorten the rod C the lever A will be swung backward on its pivot $a$, and will draw back on the bar B to prevent the gate from sagging at its outer end, and by placing the hook end $b^2$ of bar B in the different notches $b^3$ the gate may be raised more or less at its outer end and so held to more easily clear snows or obstructions, which otherwise would prevent the easy full back swing or opening of the gate.

We show the gate made of rails E, held to and between opposite pairs of uprights, F, by pins G, which allow the gate to flex edgewise, as the rails and uprights are free to turn on the pins as the outer end of the gate is raised or lowered, as circumstances may require. Ordinary hinges H connect the gate with the hinge-post I, and the opposite post, J, to which the gate closes, may have any approved device, for latching the gate.

It is obvious that our improvement may be applied to gates made, mainly, of uprights or pickets attached to horizontal top and bottom rails, and also to barn-doors and other structures requiring a brace of the character herein shown and described.

Having thus fully described our invention, we claim as new and desire to secure by Letters Patent—

1. The combination, with a gate, of a lever, A, pivoted at $a$ to the lower rear part of the gate and extending diagonally upward and forward, a bar, B, connected to the upper end of lever A and ranging diagonally downward and forward to and connected with the lower front part of the gate, and a draw-up rod connecting the upper part of the lever A with the upper rear part of the gate, substantially as herein set forth.

2. The combination, with a gate, of a lever, A, pivoted, as at $a$, to the lower rear part of the gate and extending diagonally upward and forward, a bar, B, connected to the upper end of lever A and ranging diagonally downward and forward to and connected with the lower front part of the gate, and a draw-up rod, C, provided with a turn-buckle, D, and connecting the upper part of the lever A with the upper rear part of the gate, substantially as herein set forth.

3. The combination, with a gate, of a lever, A, pivoted, as at $a$, to the lower rear part of the gate and extending diagonally upward and forward, a bar, B, connected to the upper end of lever A and ranging diagonally downward and forward to and connecting adjustably with the lower front part of the gate, which has a series of notches, as at $b^3$, to receive the end of the bar, and a draw-up rod, C D, connecting the upper part of lever A with the upper rear part of the gate, substantially as herein set forth.

WILLIAM L. WILSON.
JOHN C. WILSON.

Witnesses:
A. J. SHOMERS,
WM. REISTER.